United States Patent
Ge et al.

(10) Patent No.: US 10,719,662 B2
(45) Date of Patent: Jul. 21, 2020

(54) KNOWLEDGE MAP-BASED QUESTION-ANSWER METHOD, DEVICE, AND STORAGE MEDIUM

(71) Applicant: Alibaba Group Holding Limited, Grand Cayman (KY)

(72) Inventors: Canhui Ge, Guangzhou (CN); Xiaoxi Jiang, Guangzhou (CN); Hangcheng Zhu, Guangzhou (CN); Nengwei Hua, Guangzhou (CN); Feng Yang, Guangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 90 days.

(21) Appl. No.: 16/034,607

(22) Filed: Jul. 13, 2018

(65) Prior Publication Data

US 2019/0018839 A1 Jan. 17, 2019

(30) Foreign Application Priority Data

Jul. 14, 2017 (CN) .......................... 2017 1 0594646

(51) Int. Cl.
| | |
|---|---|
| *G06F 40/35* | (2020.01) |
| *G06F 40/30* | (2020.01) |
| *G06F 16/332* | (2019.01) |
| *G06F 16/33* | (2019.01) |
| *G06F 40/211* | (2020.01) |
| *G06F 40/295* | (2020.01) |

(52) U.S. Cl.
CPC .......... *G06F 40/30* (2020.01); *G06F 16/3329* (2019.01); *G06F 16/3344* (2019.01); *G06F 40/211* (2020.01); *G06F 40/295* (2020.01)

(58) Field of Classification Search
CPC combination set(s) only.
See application file for complete search history.

(56) References Cited

U.S. PATENT DOCUMENTS

| | | | | |
|---|---|---|---|---|
| 5,237,502 A | * | 8/1993 | White | ..................... G06F 40/56 704/1 |
| 5,418,717 A | * | 5/1995 | Su | ......................... G06F 40/216 704/9 |

(Continued)

*Primary Examiner* — Abul K Azad
(74) *Attorney, Agent, or Firm* — Alston & Bird LLP

(57) ABSTRACT

Knowledge map-based question-answer method, server, and storage medium are provided. The method includes obtaining a natural query sentence inputted by a user, and identifying a globally unique identifier, with respect to the knowledge map, of an entity in the natural query sentence. The knowledge map includes attributes and attribute values of entities and relationships thereof. The method also includes according to a context-free grammar rule, parsing the natural query sentence into a syntax tree, and according to the syntax tree, obtaining a logical expression corresponding to the natural query sentence. Moreover, the method includes according to the logical expression and the globally unique identifier of the entity, generating a machine query sentence corresponding to the knowledge map. Further, the method includes according to the machine query sentence, querying a question-answer result corresponding to the machine query sentence in the knowledge map, and feeding back the question-answer result to the user.

17 Claims, 10 Drawing Sheets

(56) References Cited

U.S. PATENT DOCUMENTS

| | | | |
|---|---|---|---|
| 8,249,856 B2* | 8/2012 | Shen | G06F 40/55 |
| | | | 704/2 |
| 2008/0256026 A1* | 10/2008 | Hays | G06F 16/242 |
| 2011/0112823 A1* | 5/2011 | Ylonen | G06F 40/211 |
| | | | 704/9 |
| 2014/0379753 A1* | 12/2014 | Roit | G06F 16/243 |
| | | | 707/771 |
| 2016/0364377 A1* | 12/2016 | Krishnamurthy | G06F 40/30 |

* cited by examiner

| Height difference between Yao Ming and Guo Jingming | search |

Yao Ming and Guo Jingming/Height difference

Yao Ming is 71 cm higher than Guo Jingming

Reference data:
Yao Ming's height: 2.26m
Guo Jingming's height: 1.55m

Expand

Figure 10

| Faye Wong's daughter | search |

Faye Wong/Daughter

| Picture A | Picture B |

Dou Jingtong   Li Yan

Expand

Figure 11

KNOWLEDGE MAP-BASED QUESTION-ANSWER METHOD, DEVICE, AND STORAGE MEDIUM

CROSS-REFERENCES TO RELATED APPLICATIONS

This application claims the priority of Chinese patent application No. 201710594646.0, filed on Jul. 14, 2017, the entirety of which is incorporated herein by reference.

FIELD OF THE DISCLOSURE

The present disclosure generally relates to the field of information search technology and, more particularly, relates to knowledge map-based question-answer method, server, and storage medium.

BACKGROUND

With the rapid development of information technology, nowadays the society has already entered the age of information explosion. More and more people are using the Internet to find information they need.

Currently, using a question-answer system to accurately obtain user's desired information has become an important way to obtain information. The existing question-answer system usually uses the keywords in the user's question as knowledge points, and performs one-to-one entity mapping within the database to find the item corresponding to the knowledge point, and then feeds back the corresponding item as an answer to the user.

However, the existing question-answer system merely establishes a one-to-one relationship mapping network, and the connection between one knowledge point and another knowledge point is very weak. Therefore, the answers fed back to the user are often inaccurate. The disclosed methods and devices are directed to solve one or more problems set forth above and other problems.

BRIEF SUMMARY OF THE DISCLOSURE

One aspect of the present disclosure includes a knowledge map-based question-answer method. The method includes obtaining a natural query sentence inputted by a user, and identifying a globally unique identifier, with respect to the knowledge map, of an entity in the natural query sentence. The knowledge map includes attributes and attribute values of entities and relationships between the entities. The method also includes according to a context-free grammar rule, parsing the natural query sentence into a syntax tree, and according to the syntax tree, obtaining a logical expression corresponding to the natural query sentence. In addition, the method includes according to the logical expression and the globally unique identifier of the entity, generating a machine query sentence corresponding to the knowledge map. Further, the method includes according to the machine query sentence, querying a question-answer result corresponding to the machine query sentence in the knowledge map, and feeding back the question-answer result to the user.

Another aspect of the present disclosure includes a server. The server includes a memory storing program instructions for a knowledge map-based question-answer method, and a processor, coupled to the memory. When executing the program instructions, the processor is configured to obtain a natural query sentence inputted by a user, and identify a globally unique identifier, with respect to the knowledge map, of an entity in the natural query sentence. The knowledge map includes attributes and attribute values of entities and relationships between the entities. The processor is further configured to according to a context-free grammar rule, parse the natural query sentence into a syntax tree, and according to the syntax tree, obtain a logical expression corresponding to the natural query sentence. The processor is further configured to according to the logical expression and the globally unique identifier of the entity, generate a machine query sentence corresponding to the knowledge map, and according to the machine query sentence, query a question-answer result corresponding to the machine query sentence in the knowledge map, and feed back the question-answer result to the user.

Another aspect of the present disclosure includes a non-transitory computer-readable storage medium containing computer-executable program instructions for, when executed by a processor, performing a knowledge map-based question-answer method. The method includes obtaining a natural query sentence inputted by a user, and identifying a globally unique identifier, with respect to the knowledge map, of an entity in the natural query sentence. The knowledge map includes attributes and attribute values of entities and relationships between the entities. The method also includes according to a context-free grammar rule, parsing the natural query sentence into a syntax tree, and according to the syntax tree, obtaining a logical expression corresponding to the natural query sentence. In addition, the method includes according to the logical expression and the globally unique identifier of the entity, generating a machine query sentence corresponding to the knowledge map. Further, the method includes according to the machine query sentence, querying a question-answer result corresponding to the machine query sentence in the knowledge map, and feeding back the question-answer result to the user.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

FIG. 10 illustrates a schematic diagram of a style of another question-answer result consistent with various disclosed embodiments of the present disclosure;

FIG. 11 illustrates a schematic diagram of a style of another question-answer result consistent with various disclosed embodiments of the present disclosure;

DETAILED DESCRIPTION

Figure 1A:
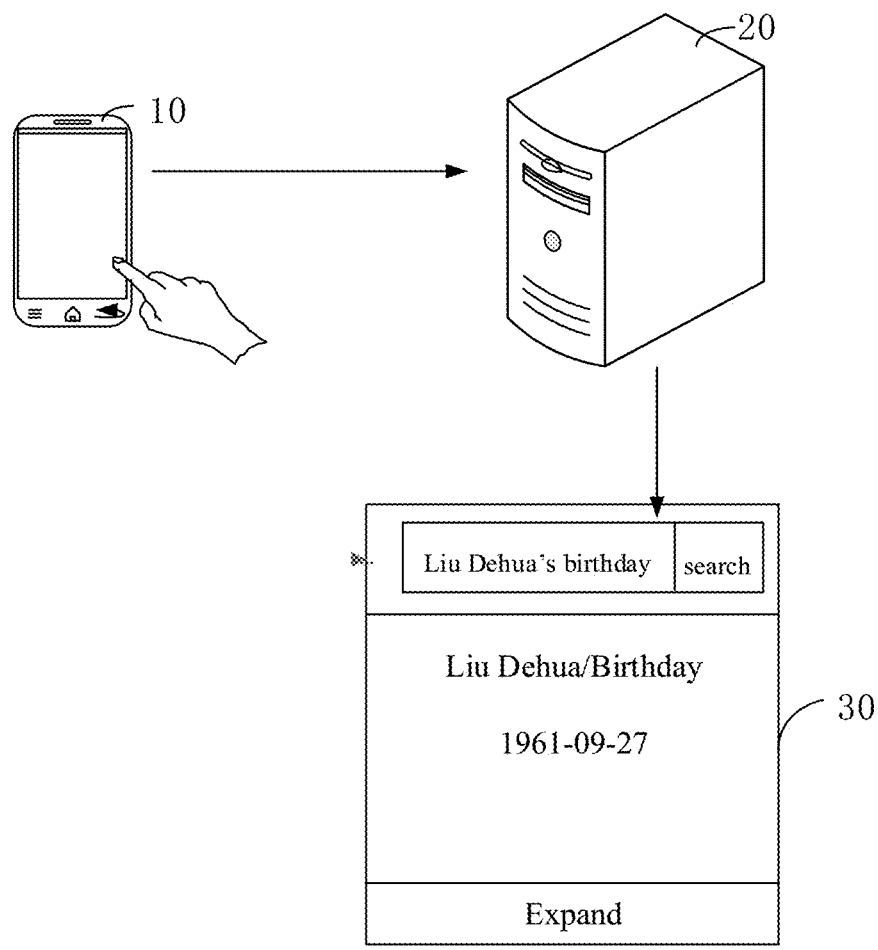
FIG. 1A illustrates a schematic diagram of a scenario of a knowledge map-based question-answer method consistent with various disclosed embodiments of the present disclosure.

Reference will now be made in detail to exemplary embodiments of the disclosure, which are illustrated in the accompanying drawings. The described embodiments are merely some but not all of the embodiments of the present disclosure. The components, which are generally described and illustrated in the figures herein, in the disclosed embodiments of the present disclosure may be arranged and designed in a wide variety of different configurations. Thus, the following detailed description of embodiments of the present disclosure provided in the drawings is not intended to limit the scope of the disclosure as claimed, but is merely representative of selected embodiments of the present disclosure. All other embodiments obtained by those skilled in the art based on the embodiments of the present disclosure without any creative work fall within the protection scope of the present disclosure.

FIG. 1A illustrates a schematic diagram of a scenario of a knowledge map-based question-answer method consistent with various disclosed embodiments of the present disclosure. Referring to FIG. 1A, a terminal 10 may be a mobile phone, a computer, a tablet, or other user devices installed with a browser. After the user inputs a natural query sentence in the browser, the browser may send the natural query sentence to a server 20. The server 20 may identify and process the natural query sentence, then obtain a question-answer result corresponding to the natural query sentence in the knowledge map, and ultimately feed back the question-answer result to the user. For example, when the user inputs the natural query sentence "Liu Dehua's birthday" in a search box, the user device may send the natural query sentence to the server 20, and the server 20 may identify and process the natural query sentence to obtain the question-answer result "1961-9-27".

Figure 1B:
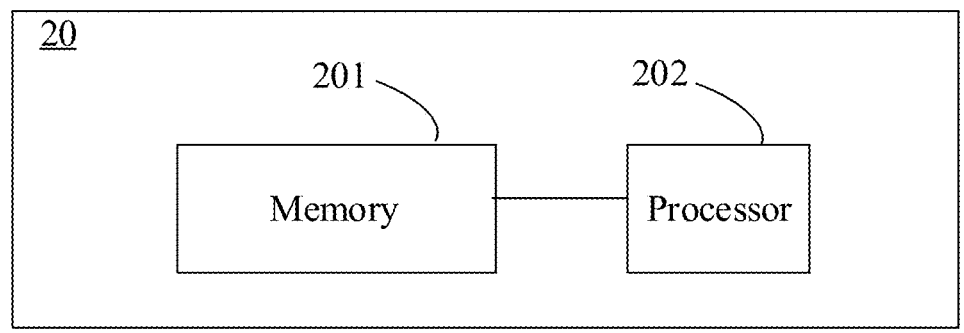
FIG. 1B illustrates an exemplary server consistent with various disclosed embodiments of the present disclosure.

FIG. 1B illustrates an exemplary server consistent with various disclosed embodiments of the present disclosure. Referring to FIG. 1B, the server 20 may include a memory 201 and a processor 202. Certain devices may be omitted and other devices may be included. The memory 201 may store program instructions for a knowledge map-based question-answer method. The processor 202 may include any appropriate processor or processors. Further, the processor 202 can include multiple cores for multi-thread or parallel processing, and may be configured to execute the knowledge map-based question-answer method.

Figure 2:
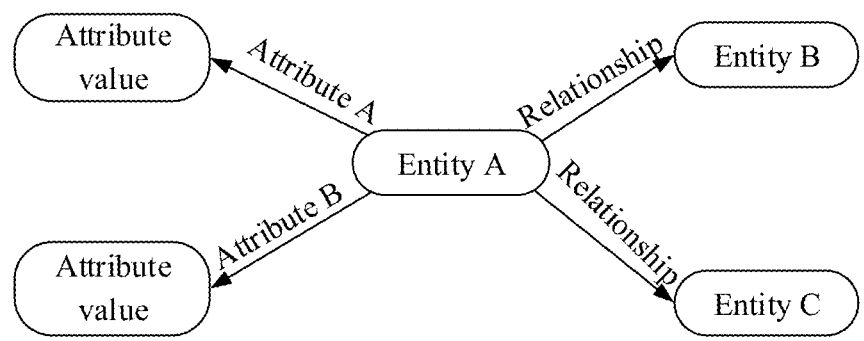
FIG. 2 illustrates a schematic structural diagram of a knowledge map consistent with various disclosed embodiments of the present disclosure.

FIG. 2 illustrates a schematic structural diagram of a knowledge map consistent with various disclosed embodiments of the present disclosure. The knowledge map may be used to describe various entities and relationships thereof that exist in the real world. The knowledge map may include the attributes and attribute values of the entities and the relationships between the entities. The knowledge map may be regard as a huge net. A node may represent an entity or a concept; and an edge may be an instance of an attribute and may be divided into two types based on the attribute type: a basic numeric type and an object type. For example, height may correspond to the basic numeric type (/type/float); and wife may correspond to the object type (/people/person). FIG. 2 illustrates the attribute and attribute value of an entity A, where the attribute may correspond to the above-mentioned basic numeric type, and entity A-related entities B and C, which may correspond to the above-described object type. Those skilled in the art may understand that the knowledge map may be stored in a database during the storage process. During the process of querying the knowledge map, the corresponding result may be found from the knowledge map for the query sentence of the database.

Figure 3:
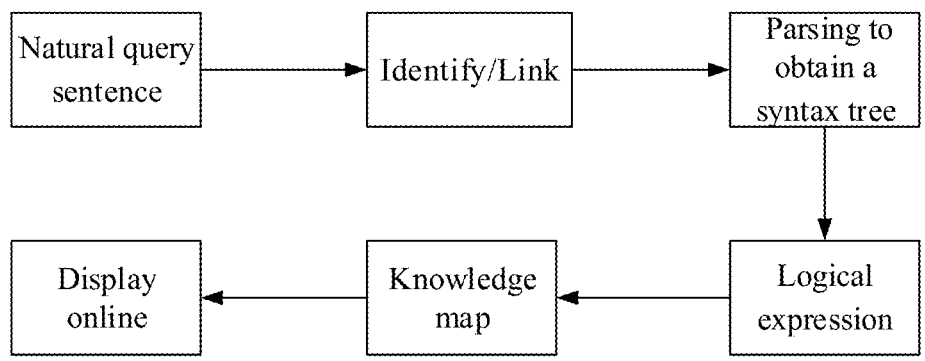
FIG. 3 illustrates an implementation block diagram of a knowledge map-based question-answer method consistent with various disclosed embodiments of the present disclosure.

FIG. 3 illustrates an implementation block diagram of the knowledge map-based question-answer method consistent with various disclosed embodiments of the present disclosure. Referring to FIG. 3, the method may mainly include the following:

1: Inputting a natural query sentence by the user;

2: Identifying an entity in the natural query sentence, and linking the entity to a corresponding entity in the knowledge map;

3: Parsing the natural query sentence into a syntax tree;

4: According to the syntax tree, obtaining a logical expression corresponding to the natural query sentence;

5: Querying the knowledge map; and

6: Displaying a question-answer result online.

Figure 4:
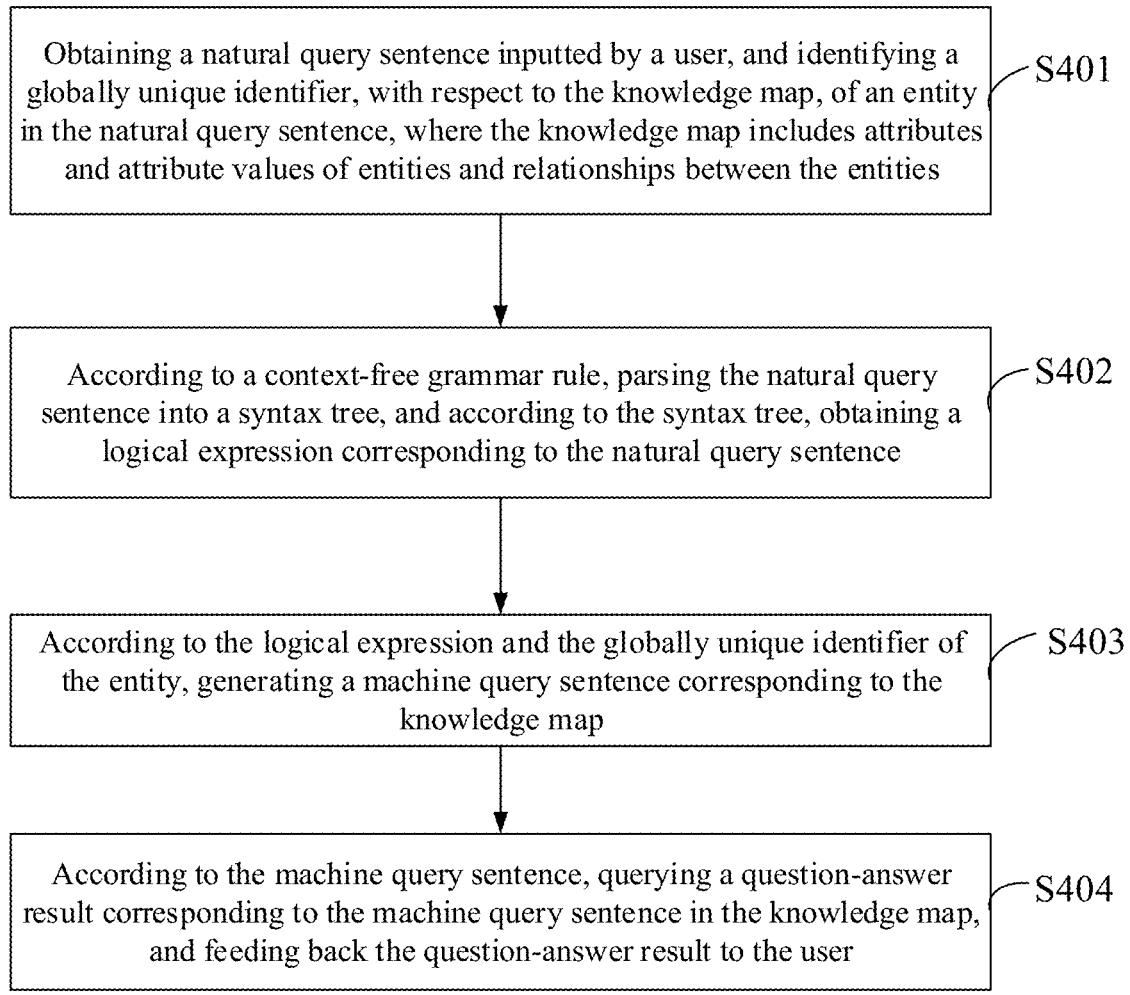
FIG. 4 illustrates a flowchart of a knowledge map-based question-answer method consistent with various disclosed embodiments of the present disclosure.

The knowledge map-based question-answer method in the present disclosure will be described in detail below with reference to FIG. 1A and FIG. 3. FIG. 4 illustrates a flowchart of the knowledge map-based question-answer method consistent with various disclosed embodiments of the present disclosure. Referring to FIG. 4, the method may include the following.

S401: Obtaining a natural query sentence inputted by the user, and identifying a globally unique identifier (GUID), with respect to the knowledge map, of an entity in the natural query sentence. The knowledge map may include attributes and attribute values of entities and relationships between the entities.

When the user needs to query the natural query sentence, the user may input the natural query sentence in the browser. After obtaining the natural query sentence, the browser may send the natural query sentence to the server. After the server obtains the natural query sentence, the server may obtain the entity involved in the natural query sentence, and then obtain the globally unique identifier (GUID), with respect to the knowledge map, of the entity. Therefore, the entity may be linked to a corresponding entity in the knowledge map. In one embodiment, each entity in the knowledge map may uniquely correspond to a GUID, and different entities in the knowledge map may be distinguished through the GUID.

S402: According to a context-free grammar rule, parsing the natural query sentence into a syntax tree, and according to the syntax tree, obtaining a logical expression corresponding to the natural query sentence.

In one embodiment, the context-free grammar rule may include a variety of rules. A matched rule may be searched from the variety of rules to parse the natural query sentence into a syntax tree. According to the syntax tree, a logical expression of the natural query sentence may be obtained.

In one embodiment, according to the context-free grammar rule, the natural query sentence may be parsed into a syntax tree from bottom to up. A logical expression corresponding to a root node of the syntax tree may be used as the logical expression corresponding to the natural query sentence.

In one embodiment, in a precise question-answer scenario, the semantics expressed by the natural query sentence may be combinable semantics, e.g., the semantics of the whole sentence may be a combination of the semantics of each part. Therefore, in one embodiment, 'lambda dcs' may be used as a logical expression of the question. Further, 'lambda dcs' is characterized by its simplicity and combinability. 'lambda dcs' is a small piece of text without containing special mathematical symbols. The 'lambda dcs' may be recursively defined.

In a detailed implementation process, the most basic expression of the 'lambda dcs' may be a primitive, a value or a variable. For example, (boolean true) # is an example of Boolean type; (number 2) # is an example of numeric type; (string "hello") # is an example of string type; (var x) # is an example of variable; and (kg: people.person.date_of_ birth) # is an example of name type which indicates a relationship.

A set of entities may be called a single tuple, e.g., (kg: type.object.type, kg: people.person), or (kg: en. Liu Dehua; kg: en. Zhang Xueyou). A set of entity pairs may be called binary tuple, e.g., 'kg: people.person.place_of_birth', # representing (kg: en Liu Dehua, kg:en, Hong Kong), and '! kg: people.person.place_of_birth', # representing (kg: en Hong Kong, kg: en, Liu Dehua). '!' may represent reversing the binary tuple.

On the basis of the primitive, more complicated expressions may be formed through various combinations of operations. An example in one embodiment may be described as follows:

JoinFormula: Joining a second parameter of the binary tuple with the single tuple, and returning to a first parameter of the binary tuple;

MergeFormula: Merging two expressions, which may be either 'and' or 'or';

AggregateFormula: Supporting 'max', 'min', 'count' and other functions; and

LambdaFormula: The aforementioned combination may merely express a unary relationship, using a lambda form to represent a binary relationship, a ternary relationship, or even a higher-order relationship.

Those skilled in the art may understand that in the foregoing embodiments, the plurality of expressions may be merely schematically provided. In a specific implementation process, other expressions may also be included, and may not be limited herein.

Optionally, the rule may also include a semantic rule. The semantic rule may involve a series of semantic-functions, and an expression of a new node may be generated by merging and calculating the respective expressions of sub-nodes. For example, the 'JoinFn' function may combine the expressions of two sub-nodes using JoinFormula, while the 'ConstantFn' function may return to a fixed value.

S403: According to the logical expression and the GUID of the entity, generating a machine query sentence corresponding to the knowledge map.

After obtaining the logical expression corresponding to the natural query sentence, according to the logical expression and the GUID of the entity, the machine query sentence corresponding to the knowledge map may be generated. For example, when the natural query sentence is "Liu Dehua's birthday" and the logical expression is (!kg:people.person.date_of_birth kg:en. Liu Dehua), the corresponding machine query sentence may be:

```
{
"query": [
   {
     "guid": "dd62f670-4725-11e5-8fdc-f80f41fb03aa",
     "/people/person/date_of_birth": ""
   }
]
},
``` where 'dd62f670-4725-11e5-8fdc-Mf41fb03aa' may be the GUID corresponding to Liu Dehua.

S404: According to the machine query sentence, querying a question-answer result corresponding to the machine query sentence in the knowledge map, and feeding back the question-answer result to the user.

Those skilled in the art may understand that the machine query sentence may be a database-matched query sentence corresponding to the knowledge map. For the obtained machine query sentence, the question-answer result may be obtained by querying the database corresponding to the knowledge map.

For example, for "Liu Dehua's birthday", the obtained query result may be:

```
{
"result": [
   {
     "/people/person/date_of_birth": ["1961-09-27"]
     " code ":" success ",
     "guid": "dd62f670-4725-11e5-8fdc-f80f41fb03aa"
   }
],
"status ":" success "
}
```

Thus, Liu Dehua's birthday may be obtained as '1961-09-27', and the question-answer result may be fed back to the user.

The knowledge map-based question-answer method in the disclosed embodiments may include obtaining the natural query sentence inputted by the user, and identifying the GUID, with respect to the knowledge map, of the entity in the natural query sentence. The method may also include according to the context-free grammar rule, parsing the natural query sentence into the syntax tree, and according to the syntax tree, obtaining the logical expression corresponding to the natural query sentence. The logical expression may fully express the semantics expressed by the natural query sentence. In addition, the method may include according to the logical expression and the GUID of the entity, generating the machine query sentence corresponding to the knowledge map. Further, the method may include according to the machine query sentence, querying the question-answer result corresponding to the machine query sentence in the knowledge map, and feeding back the question-answer result to the user. Because the knowledge map reflects a plurality of attributes and relationships thereof, the precise question-answer result may be fed back to the user.

The following uses specific embodiments to describe in detail the parsing process of the syntax tree in the present disclosure. In a specific implementation process, a plurality of terminal symbols corresponding to a natural query sentence may be obtained. According to the context-free grammar rule corresponding to a first terminal symbol, a parent node may be obtained. The parent node may include a non-terminal symbol and an intermediate logical expression. Further, the context-free grammar rule may include a semantic function, and the intermediate logical expression may be determined according to the semantic function. According to the context-free grammar rule corresponding to at least one non-terminal symbol in the parent node, the parent node may be obtained from bottom to up. The process of obtaining the parent node may be repeated until the root node is obtained.

The following description is made by taking a specific embodiment as an example.

The natural query sentence may be "Liu Dehua's birthday".

The matched context-free grammar rule may include the following:

Rule one: (rule $Person ($PHRASE) (FilterNerSpanFn));
Rule two: (rule $Birthday (birthday) (ConstantFn !kg: people.person.date_of_birth (→kg:type.date kg:people.person)));
Rule three: (rule $Date ($Person's $Birthday) (JoinFn backward)); and
Rule four: (rule $ROOT ($Date) (IdentityFn)).

Further, a general form of context-free grammar rule may be:

rule<targe-category>(<source-1> . . . <source-k>)<semantic-function>), where 'targe-category' is a non-terminal symbol, and 'source-i' is a non-terminal symbol or a terminal symbol. The whole rule may indicate that 'targe-category' may generate (<source-1> . . . <source-k>), and correspondingly, (<source-1><source-k>) may be regulated as 'targe-category'.

Figure 5:
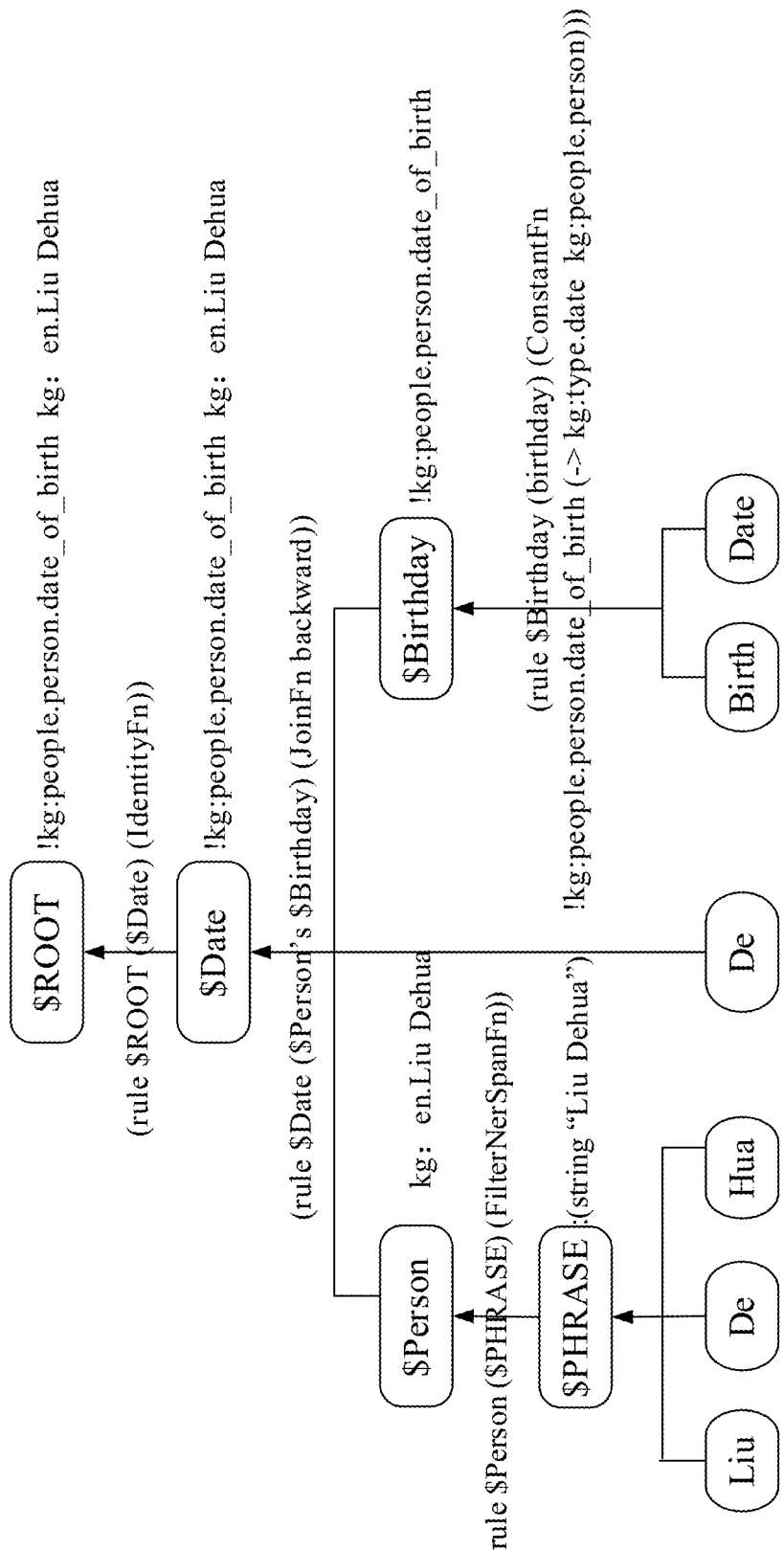
FIG. 5 illustrates a schematic structural diagram of a syntax tree consistent with various disclosed embodiments of the present disclosure.

FIG. 5 illustrates the syntax tree generated according to rule one to rule four. The detailed generation process of the syntax tree may include the following.

1: Obtaining a plurality of terminal symbols corresponding to "Liu Dehua's birthday", where each word may be a terminal symbol. For example, "Liu" is a terminal symbol, "De" is a terminal symbol, etc. The plurality of terminal symbols may be used as the leaf nodes of the syntax tree. According to the preset built-in context-free grammar rule, the terminal symbols "Liu", "De" and "Hua" may be regulated to obtain a non-terminal symbol '$PHRASE'

2: According to the '$PHRASE', searching grammar rules to get rule one, and obtaining a parent node '$Person' by regulating the '$PHRASE' as '$Person'. The parent node may include a non-terminal symbol '$Person' and an intermediate logical expression 'kg:en. Liu Dehua' obtained by performing filter operation according to the semantic function 'FilterNerSpanFn'.

3: For terminal symbols "birth" and "date", according to the terminal symbols "birth" and "date", searching grammar rules to get rule two, and obtaining a parent node "$Birthday" by regulating the terminal symbols "birth" and "date" as "$Birthday". The parent node may include the non-terminal symbol "$Birthday" and an intermediate logical expression' !kg:people .person.date_of_birth' obtained by performing constant operation according to the semantic function 'ConstantFn !kg:people.person.date_of_birth (→kg:type.date kg:people.person)'.

4: For the non-terminal symbol '$Person', a terminal symbol "'s", and the non-terminal symbol '$Birthday', searching grammar rules to get rule three, obtaining a parent node '$Date' by regulating "$Person's $Birthday" as '$Date', and at the same time, obtaining an intermediate logical expression '(!kg:people.person.date_of_birth kg:en. Liu Dehua)' according to the semantic function JoinFn backward', in other words, by performing a merge operation on the intermediate logical expression 'kg:en. Liu Dehua' and the intermediate logical expression '!kg:people.person.date_of_birth'.

5: For the non-terminal symbol "$ Date", searching the grammar rules to get rule four, and obtaining the ultimate logical expression '! kg: people.person. Date_of_birth kg:en. Liu Dehua' by regulating the '$Date' as '$ROOT' and performing identification operation according to the semantic function 'IdentityFn'.

Such parse may generate the syntax tree. Those skilled in the art may understand that the parent node and the sub-node are relative in the disclosed embodiments. For example, the '$Person' may be a parent node of '$PHRASE' and at the same time, may be a sub-node of '$Date'. Converting the logical expression into a machine query sentence and the query process may refer to the embodiment illustrated in FIG. 4.

In the disclosed embodiments, the implementation process of a simple question-answer may be provided. The disclosed embodiments may also be applicable to the implementation of iterative question-answer, where the iterative question-answer may refer to a question-answer method that requires multiple queries of the knowledge map. For example, for 'Liu Dehua's daughter's birthday', Liu Dehua's daughter "Liu Xianghui" may need to be first obtained, and then Liu Xianghui's birthday may be obtained. An example of using a syntax tree to generate a logical expression may include the following.

Natural query sentence may be 'Liu Dehua's daughter's birthday'.

The matched context-free grammar rule may include the following:

Rule one: (rule $Person ($PHRASE) (FilterNerSpanFn));
Rule two: (rule $Relation(daughter)(ConstantFn !kg people.person.daughter(→kg:people.person kg:people.person)));
Rule three: (rule $ Person ($Person's $Relation) (JoinFn backward));
Rule four: (rule $ Birthday (birthday)(ConstantFn !kg: people.person.date_of_birth (→kg:type.date kg:people.person)));
Rule five: (rule $Date ($Person's $Relation) (JoinFn backward)); and
Rule six: (rule $ROOT ($Date) (IdentityFn)).

Figure 6:
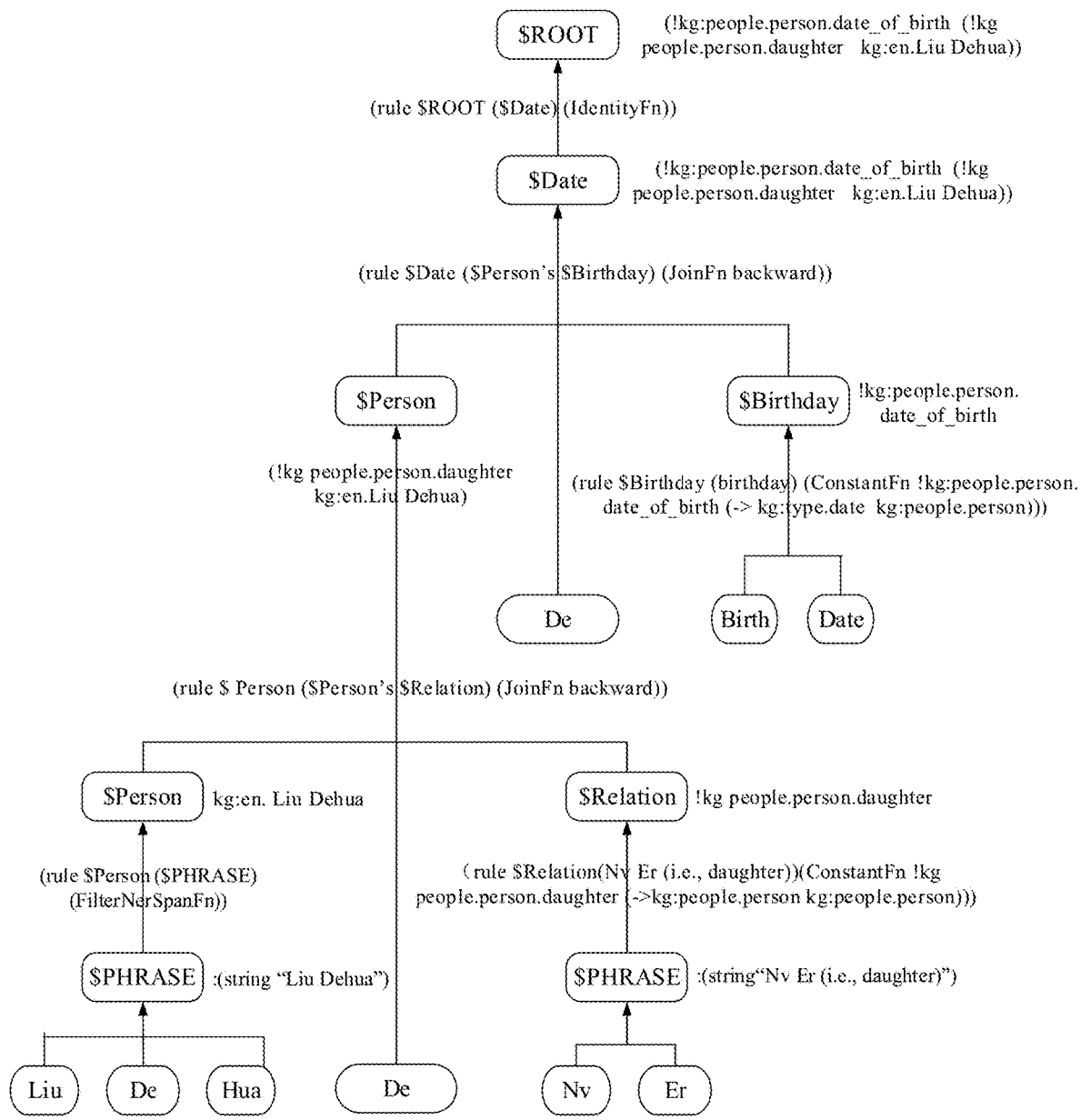
FIG. 6 illustrates a schematic structural diagram of another syntax tree consistent with various disclosed embodiments of the present disclosure.

FIG. 6 illustrates the syntax tree generated according to rule one to rule six. The manner in which a logical expression is obtained according to the syntax tree may be similar to the foregoing embodiment, which is not repeated herein.

For the natural query sentence "Liu Dehua's daughter (i.e., Nv Er)'s birthday", the ultimate logical expression may be obtained as: (!kg:people.person.date_of_birth(! kg:people.person.daughter kg:en. Liu Dehua)), where the logical expression may include an inner-layer expression and an outer-layer expression. The inner-layer expression may be !kg:people.person.daughter kg:en. Liu Dehua', and the outer-layer expression may be '(!kg:people.person.date_of_birth kg:en. Liu Xianghui)'.

Correspondingly, the process of generating the feedback result may include according to the inner-layer expression and the GUID of the entity involved in the inner-layer expression, generating a first machine query sentence corresponding to the knowledge map. The process may also include according to the first machine query sentence, querying a first question-answer result corresponding to the first machine query sentence in the knowledge map.

In addition, the process may include according to the first question-answer result or the GUID of the entity involved in the outer-layer expression and the outer-layer expression, generating a second machine query sentence corresponding to the knowledge map. Further, the process may include according to the second machine query sentence, querying a second query result corresponding to the second machine query sentence in the knowledge map, and feeding back the second query result to the user.

'Liu Dehua's daughter's birthday' continues to be used as an example. For the first machine query sentence, an GUID of the entity involved in the inner-layer expression may be 'dd62f670-4725-11e5-8fdc-Mf41fb03aa'. According to the GUID and the inner-layer expression, the first machine query sentence may be generated. The question-answer result of the first machine query sentence may be "Liu Xianghui". The detailed implementation manner of the question-answer result is not repeated herein. The first machine query sentence may include the following:

```
{
"query": [
  {
    "guid": "dd62f670-4725-11e5-8fdc-f80f41fb03aa",
    "name": "",
    "/people/person/children": [
      {
        "name": "",
        "guid":""
      }
    ]
  }
]
}
```

For the second machine query sentence, according to the first question-answer result or the GUID of the entity (Liu Xianghui) involved in the outer-layer expression and the outer-layer expression, the second machine query sentence corresponding to the knowledge map may be generated. The second machine query sentence may include the following:

```
{
"query": [
  {
    "guid": "b7d201b0-8593-11e5-94f2-d43d7e6fab60",
    "name": "",
    "/people/person/date_of_birth": ""
  }
]
}
```

Persons skilled in the art may understand that the above embodiment merely illustrate two-layer expressions. In a specific implementation process, multi-level expressions may be used, and implementation manners thereof may be similar and are not repeated herein.

On the basis of the above embodiments, when an entity in a natural query sentence involves an indefinite attribute, that is, when the entity is ambiguous, for example, a "publish" included in a natural query sentence may refer to a movie "/film/actor/staring", or may refer to a book "/book/author/book_editions_written". At this time, for example, for "Sanmao's publish", it may be unknown whether the work is a movie or a book.

Thus, type information of an entity may be added to the context-free grammar rule. At the same time, when identifying the GUID of the entity, the type information of the entity may also be identified. The type consistency matching may prevent the query from outputting incorrect results.

A specific implementation process may include when the intermediate logical expression in the parent node is used to express the entity, obtaining the type information of the identified entity. The process may also include when the intermediate logical expression in the parent node is used to express the attribute, obtaining the type information of the entity in the intermediate logical expression. Further, the process may include determining whether the identified type information is consistent with the type information of the entity in the intermediate logical expression, and if yes, according to the context-free grammar rule, which corresponds to the non-terminal symbol corresponding to the entity and the non-terminal symbol corresponding to the attribute, and according to the intermediate logical expression in each parent node, obtaining the parent node from bottom to up.

Taking 'Sanmao's publish (i.e., Zuo Pin)' as an example, the entity "Sanmao" may be identified in the natural query sentence "Sanmao's publish", and the type information of the entity "Sanmao" may be identified as a writer, that is, Sanmao is a writer.

The Matched context-free grammar rule may include the following:

Rule one: (rule $Person ($PHRASE) (FilterNerSpanFn));
Rule two: (rule $Publish(work)(ConstantFn !kg:book.author.book editions written(→kg:book.book_edition kg:book.author))); _Rule three: (rule $Book ($Person's $Publish) (JoinFn backward)); and _Rule four: (rule $ROOT ($Book) (IdentityFn)).

Figure 7:
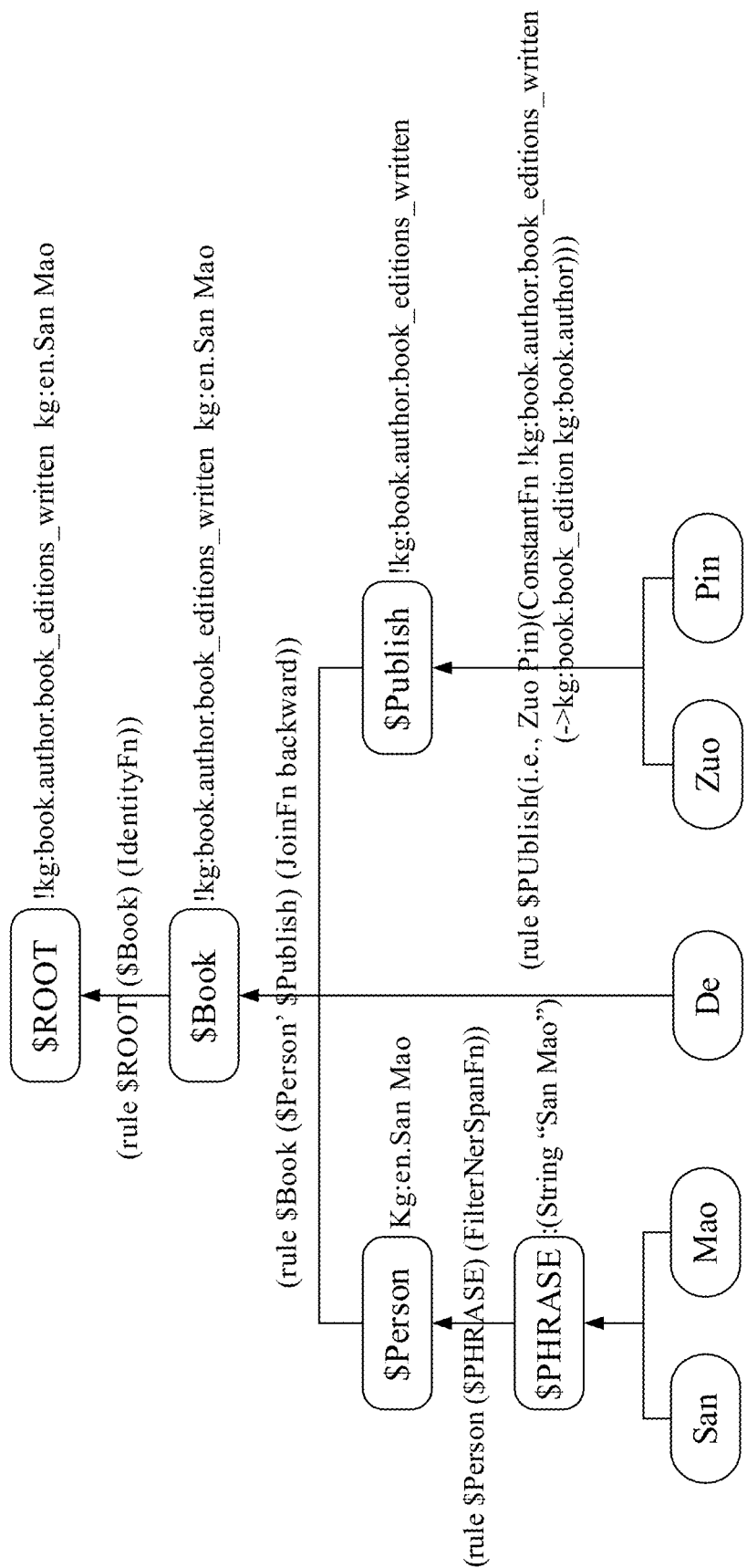
FIG. 7 illustrates a schematic structural diagram of another syntax tree consistent with various disclosed embodiments of the present disclosure.

FIG. 7 illustrates a syntax tree generated according to rule one to rule four. The manner in which a logical expression is obtained according to the syntax tree may be similar to the foregoing embodiment, and is not repeated herein. Referring to FIG. 7, in a specific implementation process, the type consistency matching process may be described as follows.

1: When the intermediate logical expression 'kg: en. Sanmao' in the parent node is used to express the entity "Sanmao", obtaining type information 'book.author' of the identified entity.

2: When the intermediate logical expression !kg:book.author.book editions written' in the parent node is used to express the attribute '$Publish', obtaining the type information 'book.author' of the entity in the intermediate logical expression, where in the intermediate logical expression, 'book.author' may be type information, and 'book.author.book editions written' may be attribute information. The intermediate logical expression may be obtained according to rule two. In the semantic function of rule two, the type information of the entity, i.e., book.author, may be set.

3: Determining whether the identified type information 'book.author' is consistent with the type information of the entity in the intermediate logical expression 'book. author', then finding rule three according to '$Person's $Publish', and obtaining the logical expression of the parent node by performing a merge operation on the intermediate logic expression corresponding to '$Person' and the intermediate logic expression corresponding to '$Publish'.

Therefore, in the disclosed embodiments, through the type consistency matching process, correct question-answer result may be identified in the presence of ambiguity.

On the basis of the foregoing embodiments, for different natural query sentences, the question-answer result in the disclosed embodiment may include different styles. The question-answer result with different style may be displayed on the user device, to enable the user to know the question-answer result.

The following provides several styles of the question-answer result, e.g., text information, single entity name, multiple entity names, comparison result, bifurcation information, multiple lists, etc., as illustrated in FIG. 8 to FIG. 13.

Figure 8:
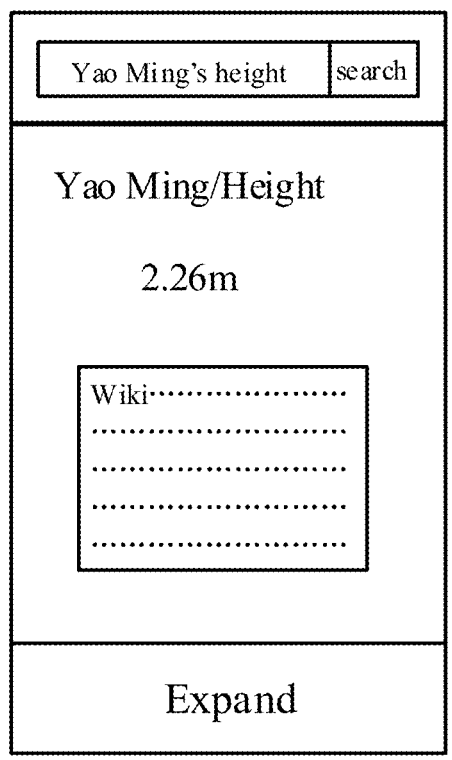
FIG. 8 illustrates a schematic diagram of a style of a question-answer result consistent with various disclosed embodiments of the present disclosure.

FIG. 8 illustrates a schematic diagram of a style of a question-answer result in the present disclosure. For a question-answer "Yao Ming's height", the question-answer result may show a text message "2.26 m".

Figure 9:
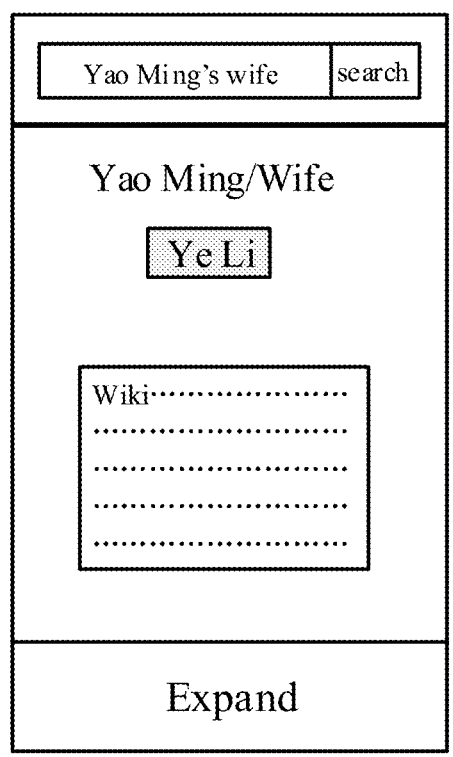
FIG. 9 illustrates a schematic diagram of a style of another question-answer result consistent with various disclosed embodiments of the present disclosure.

FIG. 9 illustrates a schematic diagram of a style of another question-answer result in the present disclosure. For a question-answer "Yao Ming's wife", the question-answer result may show the name of the single entity "Ye Li".

FIG. 10 illustrates a schematic diagram of a style of another question-answer result in the present disclosure. For a question-answer "Height difference between Yao Ming and Guo Jingming", the question-answer result may show a comparison result "Yao Ming is 71 cm higher than Guo Jingming".

FIG. 11 illustrates a schematic diagram of a style of another question-answer result in the present disclosure. For a question-answer "Faye Wong's daughter", the question-answer result may show multiple entity names "Dou Jingtong and Li Yan".

Figure 12:
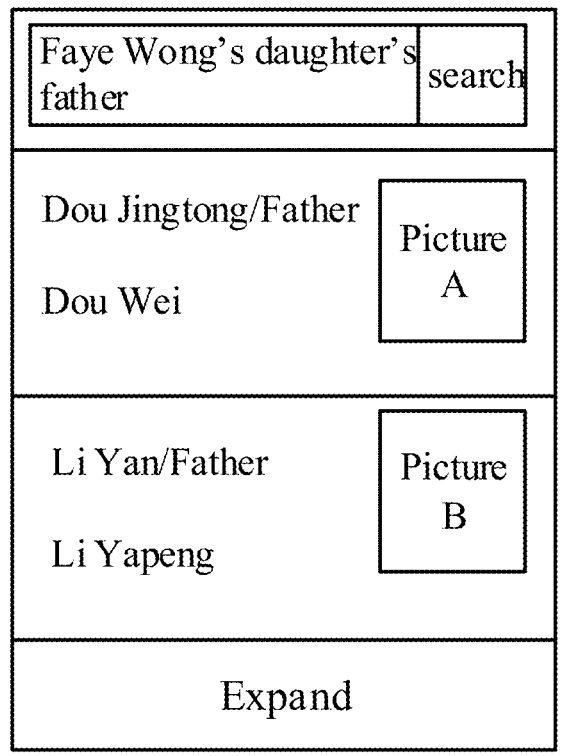
FIG. 12 illustrates a schematic diagram of a style of another question-answer result consistent with various disclosed embodiments of the present disclosure.

FIG. 12 illustrates a schematic diagram of a style of another question-answer result in the present disclosure. For a question-answer "Faye Wong's daughter's father", the question-answer result may show bifurcation information "Dou Jingtong's father, Dou Wei; and Li Yan's father, Li Yapeng".

Figure 13:
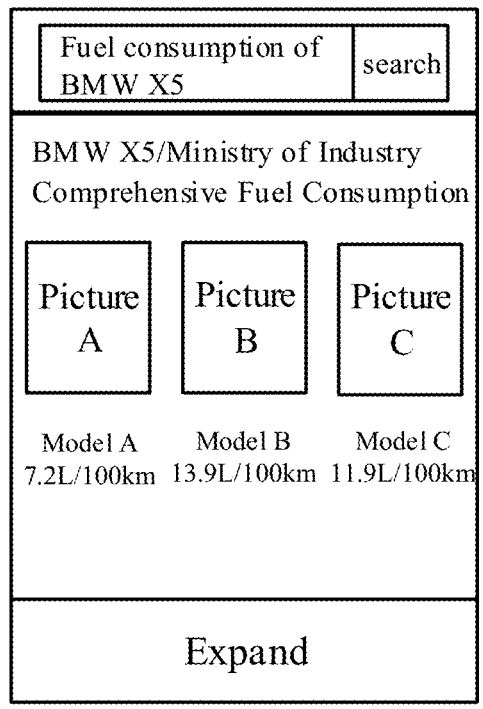
FIG. 13 illustrates a schematic diagram of a style of another question-answer result consistent with various disclosed embodiments of the present disclosure.

FIG. 13 illustrates a schematic diagram of a style of another question-answer result in the present disclosure. For a question-answer "Fuel consumption of BMW X5", the question-answer result may show multiple lists.

Those skilled in the art may understand that the above embodiments are not isolated, and respective embodiments may learn from each other and deduct other embodiments.

Figure 14:
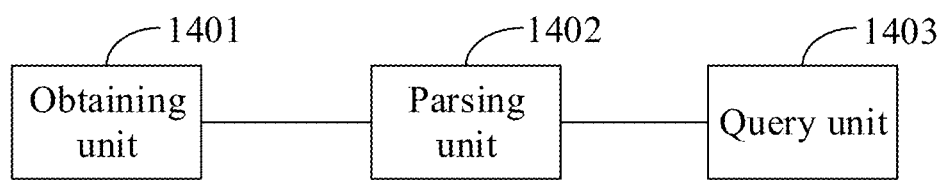
FIG. 14 illustrates a schematic diagram of a knowledge map-based question-answer device consistent with various disclosed embodiments of the present disclosure.

FIG. 14 illustrates a schematic diagram of a knowledge map-based question-answer device in the present disclosure. Referring to FIG. 14, the device may include an obtaining unit 1401, a parsing unit 1402, and a query unit 1403.

The obtaining unit 1401 may be configured to obtain a natural query sentence inputted by the user, and identify a globally unique identifier (GUID), with respect to the knowledge map, of the entity in the natural query sentence. The knowledge map may include attributes and attribute values of the entities and the relationship between entities.

The parsing unit 1402 may be configured to parse the natural query sentence into a syntax tree according to a context-free grammar rule, and obtain a logical expression corresponding to the natural query sentence according to the syntax tree.

The query unit 1403 may be configured to according to the logical expression and the GUID of the entity, generate a machine query sentence corresponding to the knowledge map, and according to the machine query sentence, query a question-answer result corresponding to the machine query sentence in the knowledge map, and feed back the question-answer result to the user.

Optionally, the parsing unit 1402 may be configured to:
according to the context-free grammar rule, parse the natural query sentence from bottom to up into the syntax tree; and
use a logical expression corresponding to a root node of the syntax tree as the logical expression corresponding to the natural query sentence.

Optionally, the parsing unit 1402 may be configured to:
obtain a plurality of terminal symbols corresponding to the natural query sentence;
according to the context-free grammar rule corresponding to the terminal symbols, obtain a parent node, where the parent node may include a non-terminal symbol and an intermediate logical expression, the context-free grammar rule may include a semantic function, and the intermediate logical expression may be determined according to the semantic function; and
according to the context-free grammar rule corresponding to at least one non-terminal symbol in the parent node, and according to the intermediate logical expression in each parent node, obtain the parent node from bottom to up, and repeat the above process of obtaining the parent node until the root node is obtained.

Optionally, at least part of the context-free grammar rule may include the type information of the entity, and the corresponding intermediate logical expression may include type information of the entity. The obtaining unit 1401 may be further configured to identify the type information of the entity in the natural query sentence.

The parsing unit 1402 may be configured to:
when the intermediate logical expression in the parent node is used to express the entity, obtain the type information of the identified entity;
when the intermediate logical expression in the parent node is used to express an attribute, obtain the type information of the entity in the intermediate logical expression; and
determine whether the identified type information is consistent with the type information of the entity in the intermediate logical expression, and if yes, according to the context-free grammar rule, which corresponds to the non-terminal symbol corresponding to the entity and the non-terminal symbol corresponding to the attribute, and according to the intermediate logical expression in each parent node, obtain the parent node from bottom to up.

Optionally, when the natural query sentence includes an iterative question-answer, the logical expression may include an inner-layer expression and an outer-layer expression. The query unit 1403 may be configured to:
according to the inner-layer expression and the GUID of the entity involved in the inner-layer expression, generate a first machine query sentence corresponding to the knowledge map;
according to the first machine query sentence, query a first question-answer result corresponding to the first machine query sentence in the knowledge map;
according to the first question-answer result or the GUID of the entity involved in the outer-layer expression and the outer-layer expression, generate a second machine query sentence corresponding to the knowledge map; and according to the second machine query sentence, query a second query result corresponding to the second machine query sentence in the knowledge map, and feed back the second query result to the user.

Optionally, the question-answer result may include any one of text information, single entity name, multiple entity names, comparison result, bifurcation information, and multiple lists.

The device provided in the disclosed embodiments may be applicable to the foregoing disclosed method. The implementation principle and technical effect thereof may be similar, and are not repeated herein.

The knowledge map-based question-answer method and device are provided in the present disclosure. The method may include obtaining the natural query sentence inputted by the user, and identifying the GUID, with respect to the knowledge map, of the entity in the natural query sentence. The method may also include according to the context-free grammar rule, parsing the natural query sentence into the syntax tree, and according to the syntax tree, obtaining the logical expression corresponding to the natural query sentence. The logical expression may fully express the semantics expressed by the natural query sentence. In addition, the method may include according to the logical expression and the GUID of the entity, generating the machine query sentence corresponding to the knowledge map. Further, the method may include according to the machine query sentence, querying the question-answer result corresponding to the machine query sentence in the knowledge map, and feeding back the question-answer result to the user. Because the knowledge map reflects a plurality of attributes and relationships thereof, the precise question-answer result may be fed back to the user.

Persons of ordinary skill in the art may understand that all or part of the steps for implementing the above method embodiments may be accomplished through program instructions related hardware. The aforementioned program may be stored in a computer-readable storage medium. When the program being executed, the steps of the foregoing method embodiments may be executed. The foregoing storage medium may include ROM, RAM, a magnetic disk, an optical disc, or various media capable of storing program codes.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A knowledge map-based question-answer method, comprising:
    obtaining a natural query sentence inputted by a user, and identifying a globally unique identifier, with respect to the knowledge map, of an entity in the natural query sentence, wherein the knowledge map includes attributes and attribute values of entities and relationships between the entities;
    according to a context-free grammar rule, parsing the natural query sentence into a syntax tree, and according to the syntax tree, obtaining a logical expression corresponding to the natural query sentence;
    according to the logical expression and the globally unique identifier of the entity, generating a machine query sentence corresponding to the knowledge map; and
    according to the machine query sentence, querying a question-answer result corresponding to the machine query sentence in the knowledge map, and feeding back the question-answer result to the user,
    wherein:
    when the natural query sentence includes an iterative question-answer, the logical expression includes an inner-layer expression and an outer-layer expression, and
    querying the question-answer result includes:
    according to the inner-layer expression and a globally unique identifier of an entity involved in the inner-layer expression, generating a first machine query sentence corresponding to the knowledge map;
    according to the first machine query sentence, querying a first question-answer result corresponding to the first machine query sentence in the knowledge map;
    according to the first question-answer result or a globally unique identifier of an entity involved in the outer-layer expression and the outer-layer expression, generating a second machine query sentence corresponding to the knowledge map; and
    according to the second machine query sentence, querying a second query result corresponding to the second machine query sentence in the knowledge map, and feeding back the second query result to the user.

2. The method according to claim 1, wherein according to the context-free grammar rule, parsing the natural query sentence into the syntax tree, and according to the syntax tree, obtaining the logical expression corresponding to the natural query sentence include:
    according to the context-free grammar rule, parsing the natural query sentence from bottom to up into the syntax tree; and
    using a logical expression corresponding to a root node of the syntax tree as the logical expression corresponding to the natural query sentence.

3. The method according to claim 2, wherein according to the context-free grammar rule, parsing the natural query sentence from bottom to up into the syntax tree includes:
    obtaining a plurality of terminal symbols corresponding to the natural query sentence;
    according to the context-free grammar rule corresponding to the terminal symbols, obtaining a parent node, wherein the parent node includes a non-terminal symbol and an intermediate logical expression, the context-free grammar rule includes a semantic function, and the intermediate logical expression is determined according to the semantic function; and
    according to the context-free grammar rule corresponding to at least one non-terminal symbol in the parent node and the intermediate logical expression in each parent node, obtaining the parent node from bottom to up, and repeating the above process of obtaining the parent node until the root node is obtained.

4. The method according to claim 3, when at least a part of the context-free grammar rule includes type information of the entity, and the corresponding intermediate logical expression includes the type information of the entity, the method further including:

identifying the type information of the entity in the natural query sentence.

5. The method according to claim 4, wherein according to the context-free grammar rule corresponding to at least one non-terminal symbol in the parent node, and according to the intermediate logical expression in each parent node, obtaining the parent node from bottom to up includes:
when the intermediate logical expression in the parent node is used to express the entity, obtaining the type information of the identified entity;
when the intermediate logical expression in the parent node is used to express an attribute, obtaining the type information of the entity in the intermediate logical expression; and
determining whether the identified type information is consistent with the type information of the entity in the intermediate logical expression, and if yes, according to the context-free grammar rule, which corresponds to a non-terminal symbol corresponding to the entity and a non-terminal symbol corresponding to the attribute, and according to the intermediate logical expression in each parent node, obtaining the parent node from bottom to up.

6. The method according to claim 1, wherein:
the question-answer result includes one of text information, single entity name, multiple entity names, comparison result, bifurcation information, and multiple lists.

7. A server, comprising:
a memory, storing program instructions for a knowledge map-based question-answer method; and
a processor, coupled to the memory and, when executing the program instructions, configured to:
obtain a natural query sentence inputted by a user, and identify a globally unique identifier, with respect to the knowledge map, of an entity in the natural query sentence,
wherein the knowledge map includes attributes and attribute values of entities and relationships between the entities;
according to a context-free grammar rule, parse the natural query sentence into a syntax tree, and according to the syntax tree, obtain a logical expression corresponding to the natural query sentence;
according to the logical expression and the globally unique identifier of the entity, generate a machine query sentence corresponding to the knowledge map, and according to the machine query sentence, query a question-answer result corresponding to the machine query sentence in the knowledge map, and feed back the question-answer result to the user
wherein:
when the natural query sentence includes an iterative question-answer, the logical expression includes an inner-layer expression and an outer-layer expression, and
the question-answer result is queried by the processor configured to:
according to the inner-layer expression and a globally unique identifier of an entity involved in the inner-layer expression, generate a first machine query sentence corresponding to the knowledge map;
according to the first machine query sentence, query a first question-answer result corresponding to the first machine query sentence in the knowledge map;

according to the first question-answer result or a globally unique identifier of an entity involved in the outer-layer expression and the outer-layer expression, generate a second machine query sentence corresponding to the knowledge map; and
according to the second machine query sentence, query a second query result corresponding to the second machine query sentence in the knowledge map, and feed back the second query result to the user.

8. The server according to claim 7, wherein the processor is further configured to:
according to the context-free grammar rule, parse the natural query sentence from bottom to up into the syntax tree; and
use a logical expression corresponding to a root node of the syntax tree as the logical expression corresponding to the natural query sentence.

9. The server according to claim 8, wherein the processor is further configured to:
obtain a plurality of terminal symbols corresponding to the natural query sentence;
according to the context-free grammar rule corresponding to the terminal symbols, obtain a parent node, wherein the parent node includes a non-terminal symbol and an intermediate logical expression, the context-free grammar rule includes a semantic function, and the intermediate logical expression is determined according to the semantic function; and
according to the context-free grammar rule corresponding to at least one non-terminal symbol in the parent node and the intermediate logical expression in each parent node, obtain the parent node from bottom to up, and repeat the above process of obtaining the parent node until the root node is obtained.

10. The server according to claim 9, when at least a part of the context-free grammar rule includes type information of the entity, and the corresponding intermediate logical expression includes the type information of the entity, the processor is further configured to:
identify the type information of the entity in the natural query sentence.

11. The server according to claim 10, wherein the processor is further configured to:
when the intermediate logical expression in the parent node is used to express the entity, obtain the type information of the identified entity;
when the intermediate logical expression in the parent node is used to express an attribute, obtain the type information of the entity in the intermediate logical expression; and
determine whether the identified type information is consistent with the type information of the entity in the intermediate logical expression, and if yes, according to the context-free grammar rule, which corresponds to a non-terminal symbol corresponding to the entity and a non-terminal symbol corresponding to the attribute, and according to the intermediate logical expression in each parent node, obtain the parent node from bottom to up.

12. The server according to claim 7, wherein:
the question-answer result includes one of text information, single entity name, multiple entity names, comparison result, bifurcation information, and multiple lists.

13. A non-transitory computer-readable storage medium containing computer-executable program instructions for, when executed by a processor, performing a knowledge map-based question-answer method, the method comprising:

obtaining a natural query sentence inputted by a user, and identifying a globally unique identifier, with respect to the knowledge map, of an entity in the natural query sentence, wherein the knowledge map includes attributes and attribute values of entities and relationships between the entities, according to a context-free grammar rule, parsing the natural query sentence into a syntax tree, and according to the syntax tree, obtaining a logical expression corresponding to the natural query sentence, according to the logical expression and the globally unique identifier of the entity, generating a machine query sentence corresponding to the knowledge map, and according to the machine query sentence, querying a question-answer result corresponding to the machine query sentence in the knowledge map, and feeding back the question-answer result to the user, wherein:

when the natural query sentence includes an iterative question-answer, the logical expression includes an inner-layer expression and an outer-layer expression, and querying the question-answer result includes:

according to the inner-layer expression and a globally unique identifier of an entity involved in the inner-layer expression, generating a first machine query sentence corresponding to the knowledge map;

according to the first machine query sentence, querying a first question-answer result corresponding to the first machine query sentence in the knowledge map;

according to the first question-answer result or a globally unique identifier of an entity involved in the outer-layer expression and the outer-layer expression, generating a second machine query sentence corresponding to the knowledge map; and according to the second machine query sentence, querying a second query result corresponding to the second machine query sentence in the knowledge map, and feeding back the second query result to the user.

14. The storage medium according to claim 13, wherein according to the context-free grammar rule, parsing the natural query sentence into the syntax tree, and according to the syntax tree, obtaining the logical expression corresponding to the natural query sentence include:

according to the context-free grammar rule, parsing the natural query sentence from bottom to up into the syntax tree; and using a logical expression corresponding to a root node of the syntax tree as the logical expression corresponding to the natural query sentence.

15. The storage medium according to claim 14, wherein according to the context-free grammar rule, parsing the natural query sentence from bottom to up into the syntax tree includes:

obtaining a plurality of terminal symbols corresponding to the natural query sentence;

according to the context-free grammar rule corresponding to the terminal symbols, obtaining a parent node, wherein the parent node includes a non-terminal symbol and an intermediate logical expression, the context-free grammar rule includes a semantic function, and the intermediate logical expression is determined according to the semantic function; and according to the context-free grammar rule corresponding to at least one non-terminal symbol in the parent node and the intermediate logical expression in each parent node, obtaining the parent node from bottom to up, and repeating the above process of obtaining the parent node until the root node is obtained.

16. The storage medium according to claim 15, when at least a part of the context-free grammar rule includes type information of the entity, and the corresponding intermediate logical expression includes the type information of the entity, the method further including:

identifying the type information of the entity in the natural query sentence.

17. The storage medium according to claim 16, wherein according to the context-free grammar rule corresponding to at least one non-terminal symbol in the parent node, and according to the intermediate logical expression in each parent node, obtaining the parent node from bottom to up includes:

when the intermediate logical expression in the parent node is used to express the entity, obtaining the type information of the identified entity;

when the intermediate logical expression in the parent node is used to express an attribute, obtaining the type information of the entity in the intermediate logical expression; and determining whether the identified type information is consistent with the type information of the entity in the intermediate logical expression, and if yes, according to the context-free grammar rule, which corresponds to a non-terminal symbol corresponding to the entity and a non-terminal symbol corresponding to the attribute, and according to the intermediate logical expression in each parent node, obtaining the parent node from bottom to up.

* * * * *